United States Patent [19]
Edwards et al.

[11] 3,818,755
[45] June 25, 1974

[54] TESTING TIRES
[76] Inventors: Reginald Harold Edwards; Geoffrey Lloyd Owens, both of c/o Fort Dunlop, Erdington, Birmingham, England
[22] Filed: Feb. 16, 1973
[21] Appl. No.: 333,369

[30] Foreign Application Priority Data
Feb. 26, 1972    Great Britain...................... 8965/72

[52] U.S. Cl............................... 73/146, 73/432 SD
[51] Int. Cl............................................ B21c 47/00
[58] Field of Search ........73/146, 432 SD; 152/367; 137/72

[56] References Cited
UNITED STATES PATENTS
3,645,479   2/1972   Kostroun............................ 137/72

Primary Examiner—Donald O. Woodiel
Attorney, Agent, or Firm—Stevens, Davis, Miller & Mosher

[57] ABSTRACT

A method for simulating a tire burst in a pneumatic tire comprising preforming a hole in the sidewall of the tire and plugging the hole with a hollow rubber bung closed at the end only, the closed end being disposed towards the exterior of the tire. The rubber bung is retained in the hole when the tire is inflated and subsequently released from the hole to simulate a tire burst, of which the following is a specification.

16 Claims, 5 Drawing Figures

TESTING TIRES

This invention relates to the testing of pneumatic tires.

In investigating tire safety and vehicle behaviour under emergency conditions it is sometimes desirable to simulate a tire burst i.e., an explosive deflation of a tire. In achieving such a simulation there are considerable problems in ensuring that the tire holds air satisfactorily under the burst and in ensuring that the burst occurs at exactly the desired instant.

According to the present invention a method for testing a pneumatic tire comprises preforming a hole in the sidewall of the tire, plugging the hole with a hollow rubber bung closed at one end only, the closed end being disposed towards the exterior of the tire, retaining the rubber bung in the hole, inflating the pneumatic tire and removing the bung from the hole to simulate a tire burst. The hole in the sidewall of the tire is preferably drilled to a substantially circular configuration having a diameter of one half to 1 inch.

The invention also provides a pneumatic tire test apparatus for simulating a burst in a pneumatic tire comprising a hollow rubber bung closed at one end only for plugging a preformed hole in the sidewall of a pneumatic tire, means for holding the rubber bung in the tire sidewall when the tire is inflated and means for effecting release of the rubber bung from the hole in the sidewall of the inflated tire to simulate a tire burst.

The hollow rubber bung preferably has a substantially circular cross-section having a diameter of one half to 1 inch. Owing to the repeated flexing of a tire during running the hole is continuously changing shape. It was found that for a plug to satisfactorily stop the hole it is necessary for the plug to comply with these repeated changes in shape, solid plugs being generally unsatisfactory. The plug used in this invention is a hollow rubber bung preferably of tapered form with a slight taper extending towards the exterior of the tire and hence also the closed end of the bung. The bung is of such a size relative to the hole that the stopped end projects at least slightly through the hole so that the walls of the bung contact the sides of the hole. In this position the bung is able to flex with the hole and the tire inflation pressure holds the walls of the bung against the sides of the hole improving the seal therebetween.

The retaining means may include a heat rupturable member which is ruptured to permit release of the rubber bung from the hole in the sidewall of the inflated tire. Generally the heat rupturable member is heated electrically to a temperature at which it ruptures and, to enable the test apparatus to be used on a rotating wheel carrying the tire the electric circuit for heating the heat rupturable member includes a rotary electrical contact. The heat rupturable member may comprise a metal wire which is heated to fusion and breakage or a plastics member which is heated to cause it to melt and break.

As an alternative to a heat rupturable member the retaining means may comprise a link pin displaceable from the retaining means to permit release of the rubber bung from the hole in the inflated tire. The means for effecting release of the rubber bung from the hole in the sidewall of the inflated tire may comprise a spring and plunger device operable to displace the link pin from the retaining means.

The retaining means for holding the rubber bung in the preformed hole may comprise a strap or wire adapted to be fixed to the sidewall of the tire so as to extend across the hole. A pair of bolts with suitably large washers may be passed through the tyre sidewall on either side of the main hole to hold the ends of the strap or wire. Where this type of retaining means is used its release will enable the bung to be blown out of the hole by the air pressure in the tire.

Alternatively, the retaining means may comprise a collar adapted to be located on the interior of the sidewall of the tire to hold the rubber bung in the hole. Similarly a deformable or frangible clip may be provided inside the tire, the clip being of sufficient strength to hold the bung in the hole against the pressure in the tire but being able to be overcome by a pull on the bung from outside the tire. Such a pull may be provided using the spring and plunger device mentioned above utilizing a stronger spring to furnish the necessary force.

The invention further provides a spring and plunger device for use in a pneumatic tire test apparatus for simulating a burst in a pneumatic tire comprising means for locating the device on a vehicle wheel, plunger means movable between a withdrawn position to a position in which it actuates means on the tire for effecting a tire burst, trigger means for holding the plunger means in the withdrawn position against the action of a compressed spring and release means for releasing the trigger means to initiate movement of the plunger means, said release means including a rotary coupling to enable the spring and plunger means to rotate relative to the release means.

The invention provides a simple but effective and reliable method of simulating a burst tire under controlled conditions.

Some examples of the invention will now be described, by way of example only with reference to the accompanying drawings in which.

Figure 1:
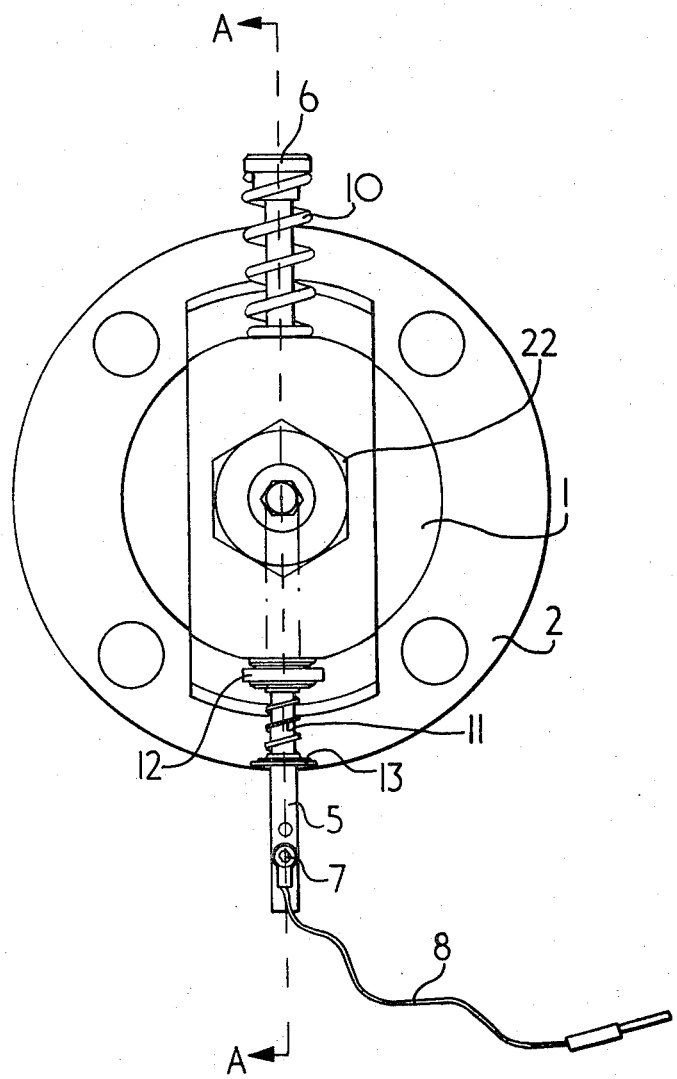
FIG. 1 is a plan view of a spring and plunger mechanism with a trigger mechanism provided with a rotary coupling.
Figure 2:
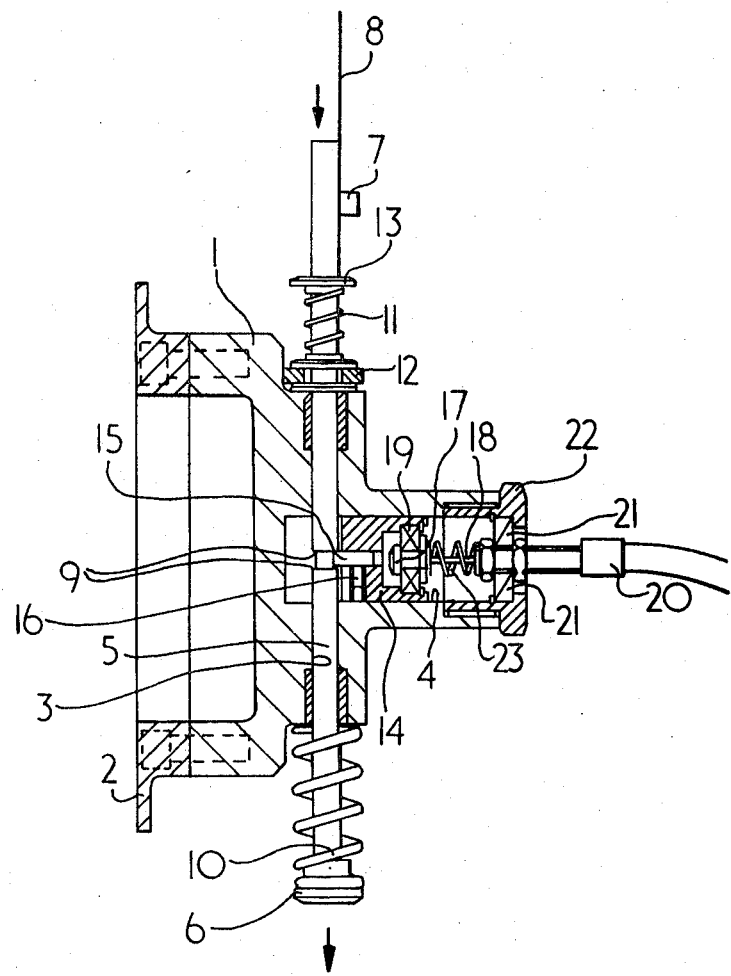
FIG. 2 is a sectional view along line A—A of FIG. 1.

As shown in FIGS. 1 and 2 the spring and plunger mechanism consists of a circular body 1 having a circular flanged base 2 for bolting on to a wheel over a wheel hub. The body 1 contains a diametric bore 3, open at both ends, and an axial bore 4 which intersects the bore 3 and is blind at its end nearest the base 2 of the body 1.

In the diametric bore 3 is located a plunger 5 having a head 6 at one end and at the other end a removable bolt 7 to which a wire lanyard 8 is attached. The plunger is also provided with a notched portion 9 in the region of the plunger inside the bore 3. Between the head 6 and the body 1 is a coil spring 10 located on the plunger and on the other end of the plunger between the body 1 and the bolt 7 a weaker spring 11 is located. The spring 11 is not anchored on the plunger but is free to slide along the plunger. One end of the spring is attached to a collar 12 and the other end carries a washer 13 beyond which the bolt 7 cannot pass.

In the axial bore 4 is located a piston 14 from the end of which a pin 15 projects slightly, the pin being held in position by a grub screw 16. The pin 15 is of suitable size to engage the notched portion 9 of the plunger thereby to hold the plunger against the force of the spring 10.

The piston 14 is coupled to the nippled end 17 of a Bowden cable 18 through a bearing 19 which allows rotation of the piston relative to the cable.

The outer cover 20 of the Bowden cable is attached through a bearing 21 to a nut 22 screwed firmly into the open end of the axial bore and a small coil spring 23 is located between this nut 22 and the piston 14 to spring-load the piston head towards the plunger. In operation of this mechanism the headed end 6 of the plunger 5 is pushed towards the body 1 against the force of the spring 10 until the pin 15, which is urged towards the plunger 5, engages the notched portion 9 of the plunger. The pin will then hold the plunger in that position and the mechanism is cocked. A pull on the Bowden cable 18 will then move the piston 14 away from the plunger disengaging the pin 15 from the notched portion 9 and the plunger will fly, owing to the release of the pent-up force of the spring 10 in the direction shown by the arrow in FIG. 2. The function of the spring 11 is to absorb the momentum of the plunger 5 to prevent the bolt 7 hitting the body of the mechanism.

The release of the plunger 5 under the influence of the spring 10 gives a strong jerk on the lanyard 8 which can be utilized to release a rubber bung from a hole in a tire sidewall.

Figure 3:
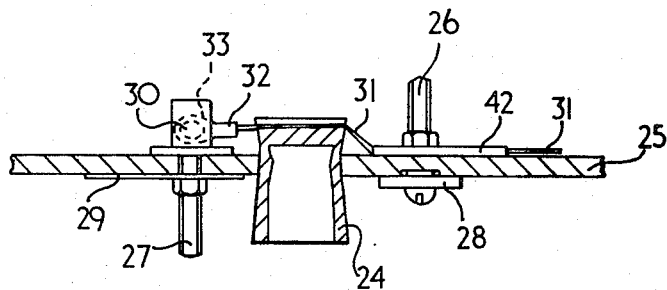
FIG. 3 is a section through part of a tyre sidewall containing a hole plugged by a rubber bung which is held in position by a flexible strip.

In the arrangement shown in FIG. 3 a hollow rubber bung 24 is inserted with its closed end projecting just through a hole in a tire sidewall 25, the open end of the bung being on the inside of the tire. On either side of the hole in the sidewall, bolts 26, 27 are passed through the sidewall 25 each being provided with large washers 28, 29 to spread the load on the inside of the sidewall. The bolt 27 is provided with a head having a large base to act as a washer and a cylindrical portion which contains a slit in a longitudinal plane and a transverse bore 30 perpendicular to and intersecting the slit.

The bolt 26 passes through a folded flat metal strip 42 in which is anchored a flexible strap 31 to hold the bung in position. On the other end of the strap 31 is carried a metal coupling 32 which comprises a flat metal ring 33 able to slide into the slit in the head of the bolt 27. The strap 31 is thus passed over the end of the bung 24, the ring 33 slid into the slit in the head of the bolt 27 and a pin (not shown) inserted into the bore 30 the ring 33 being positioned so that the pin passes through its center. The strap 31 is thus anchored at both ends to enable it to restrain the bung from being forced out of the tire. The end of the bung is provided with a shallow groove to locate the strap and prevent it slipping. The washer 29 is arranged with its elongated side furthest from the bung 24 to keep the bolt 27 normal to the sidewall and resist tilting of the bolt under the influence of the strap tension.

The pin anchoring the strap is attached to the lanyard 8 of the mechanism shown in FIGS. 1 and 2.

Thus in operation the pin may be jerked out of the bore 30 freeing the one end of the strap 31 which will then flex aside and allow the bung 24 to be blown out of the hole by pressure in the tire. To ensure immediate ejection of the bung the surface of the bung may be lubricated.

It should be noted that the centers of the three holes in the sidewall in the arrangement shown in FIG. 3 are arranged on a line which is tangential to a circle on the sidewall centred on the tire axis and passing through the center of the hole containing the bung.

Figure 4:
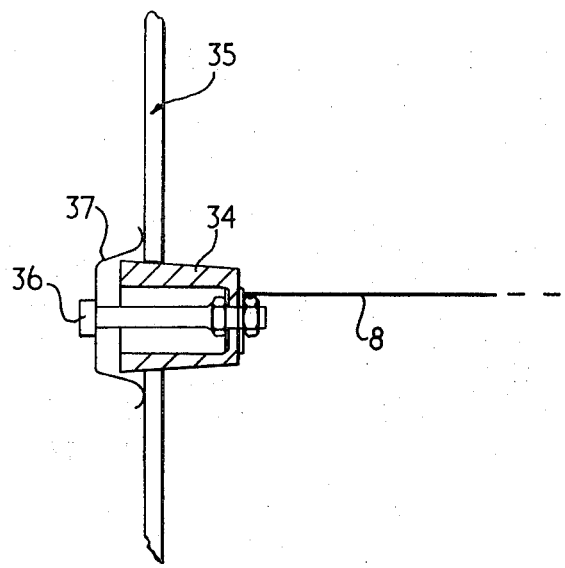
FIG. 4 is a similar view to FIG. 3 showing a clip-type restraint for the bung.

In the arrangement shown in FIG. 4 a bung 34 is positioned in a hole in a tire sidewall 35. A bolt 36 longer than the bung is passed through the center of the stopped end of the bung so that the ends of the bolt lie beyond the ends of the bung. To the end of the bolt projecting through the stopped end of the bung is attached the lanyard 8 of the mechanism of FIGS. 1 and 2. A deformable clip 37 made of any suitable material is attached to the other end of the bolt and engages the inside of the tire sidewall to hold the bung in place.

In operation a strong pull on the lanyard 8 deforms the clip 37 pulling the bung out of the hole in the sidewall.

Figure 5:
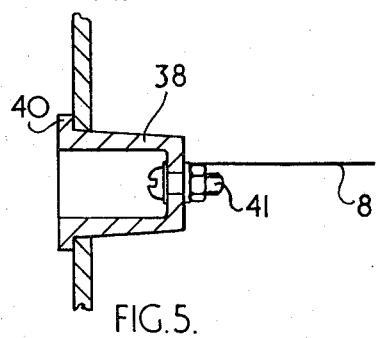
FIG. 5 is another similar view to FIG. 3 showing a collar-type restraint for the bung.

In the arrangement shown in FIG. 5 a bung 38 is positioned in a hole in a tire sidewall 39. The bung 38 is provided with an integral rubber collar 40 which engages the interior of the tyre sidewall 39 to hold the bung in place in the inflated tire. The lanyard 8 in this case is attached by a short bolt 41 to the stopped end of the bung 38 so that again a strong jerk on the lanyard will remove the bung from the hole.

Having now described our invention —what we claim is:

1. A method for testing a pneumatic tire including:
   preforming a hole in the sidewall of the tire,
   plugging the hole with a hollow rubber bung closed at one end only, the closed end being disposed towards the exterior of the tire,
   retaining the rubber bung in the hole,
   inflating the pneumatic tire and
   removing the bung to simulate a tire burst.

2. A method for testing a pneumatic tire according to claim 1 wherein the hole in the sidewall of the tire is drilled to a substantially circular configuration having a diameter of one half to 1 inch.

3. Pneumatic tire test apparatus for simulating a burst in a pneumatic tire including:
   a hollow bung closed at one end only for plugging a preformed hole in the sidewall of a pneumatic tire,
   retaining means for holding the rubber bung in the sidewall of the tire when the tire is inflated and
   means for effecting release of the rubber bung from the hole in the sidewall of the inflated tire to simulate a tire burst.

4. Pneumatic tire test apparatus according to claim 4 wherein the hollow rubber bung has a substantially circular cross-section having a diameter of one half to 1 inch.

5. Pneumatic tire test apparatus as claimed in claim 3 wherein the bung is tapered from its open end to its closed end.

6. Pneumatic tire test apparatus according to claim 3 wherein the retaining means includes a heat rupturable member which is ruptured to permit release of the rubber bung from the hole in the sidewall of the inflated tire.

7. Pneumatic tire test apparatus according to claim 6 in which the heat rupturable member is heated electrically to a temperature at which it ruptures.

8. Pneumatic tire test apparatus according to claim 7 including an electric circuit for electrically heating the heat rupturable member having a rotary electrical contact to enable the apparatus to be used on a rotating wheel carrying the tire.

9. Pneumatic tire test apparatus according to claim 6 wherein the heat rupturable member comprises a plastics material.

10. Pneumatic tire test apparatus according to claim 3 wherein the retaining means comprises a link pin displaceable from the retaining means to permit release of the rubber bung from the hole in the inflated tire.

11. Pneumatic tire test apparatus according to claim 10 wherein the means for effecting release of the rubber bung from the hole in the sidewall of the inflated tire comprises a spring and plunger device operable to displace the link pin from the retaining means.

12. Pneumatic tyre test apparatus according to claim 3 wherein the retaining means comprises a strap adapted to be fixed to the sidewall of the tire to hold the rubber bung in a hole in the sidewall of the inflated tire.

13. Pneumatic tire test apparatus according to claim 3 wherein the retaining means comprises a collar adapted to be located on the interior of the sidewall of the tire to hold the rubber bung in a hole in the sidewall of the inflated tire.

14. Pneumatic tire test apparatus according to claim 3 wherein the retaining means comprises a deformable or breakable clip of sufficient strength to hold the rubber bung in the hole in the sidewall of the tire against the inflation pressure in the tire, said clip being deformed or broken in response to the application of a pull on the rubber bung from outside the tire.

15. Pneumatic tire test apparatus according to claim 14 wherein the means for effecting release of the rubber bung from the hole in the sidewall of the inflated tire includes a spring and plunger device connected to the rubber bung.

16. A spring and plunger device for use in a pneumatic tire test apparatus for simulating a burst in a pneumatic tire including:
    means for locating the device on a vehicle wheel,
    plunger means movable between a withdrawn position to a position in which it actuates means on the tire for effecting a tire burst, trigger means for holding the plunger means in the withdrawn position against the action of a compressed spring,
    release means for releasing the trigger means to initiate movement of the plunger means and a rotary coupling for enabling the spring and plunger means to rotate relative to the release means.

* * * * *